(12) United States Patent
Bellmore et al.

(10) Patent No.: US 9,248,632 B2
(45) Date of Patent: Feb. 2, 2016

(54) FILM FOR FLEXIBLE PACKAGING FOR USE IN BAG IN BOX PACKAGING AND BAGS MADE THEREFROM

(71) Applicant: Scholle Corporation, Irvine, CA (US)

(72) Inventors: David Bellmore, DeWitt, MI (US); Karen Berger, Villa Park, IL (US)

(73) Assignee: SCHOLLE CORPORATION, Northlake, IL (US)

( * ) Notice: Subject to any disclaimer, the term of this patent is extended or adjusted under 35 U.S.C. 154(b) by 0 days.

(21) Appl. No.: 13/969,695

(22) Filed: Aug. 19, 2013

(65) Prior Publication Data

US 2015/0049964 A1 Feb. 19, 2015

(51) Int. Cl.
*B32B 27/32* (2006.01)
*B32B 27/08* (2006.01)
*B32B 27/30* (2006.01)
*B29C 47/06* (2006.01)

(52) U.S. Cl.
CPC .............. *B32B 27/327* (2013.01); *B29C 47/065* (2013.01); *B32B 27/08* (2013.01); *B32B 27/306* (2013.01); *B32B 27/32* (2013.01); *B32B 2250/05* (2013.01); *B32B 2250/24* (2013.01); *B32B 2307/558* (2013.01); *B32B 2439/06* (2013.01); *B32B 2439/46* (2013.01)

(58) Field of Classification Search
CPC .......... B32B 1/02; B32B 1/08; B32B 27/306; B32B 27/32; B32B 27/327
USPC ........... 428/34.2–34.4, 34.8, 35.7–35.9, 36.6, 428/36.7, 500, 515–519, 521, 523
See application file for complete search history.

(56) References Cited

U.S. PATENT DOCUMENTS

| 5,885,707 | A  | * | 3/1999 | Kaschel et al. ............... | 428/349 |
| 5,911,665 | A  | * | 6/1999 | Heydarpour et al. .......... | 53/449 |
| 7,510,775 | B2 | * | 3/2009 | Pradel .......................... | 428/461 |
| 8,147,934 | B2 | * | 4/2012 | Berbert ........................ | 428/34.8 |

* cited by examiner

*Primary Examiner* — Walter B Aughenbaugh
(74) *Attorney, Agent, or Firm* — The Watson I.P. Group, PLC; Jovan N. Jovanovic; Vladan M. Vasiljevic

(57) ABSTRACT

A film for a bag. The film includes a plurality of extruded layers, with the layers including a first layer, a second layer, a third layer, a fourth layer, and a fifth layer. The first layer is a mixture of metallocene polyethylene and linear low density polyethylene. The second layer contacting the first layer and comprising a tie layer. The third layer contacts the second layer opposite the first layer. The third layer comprises ethylene vinyl alcohol having a mol % ethylene of at least approximately 24 mol % and a thickness of between approximately 0.01 mil and 0.40 mil. The fourth layer contacts the third layer opposite of the second layer. The fourth layer comprises a tie layer. The fifth layer contacts the fourth layer opposite the third layer. The fifth layer comprises a metallocene polyethylene and liner low density polyethylene. The film includes a thickness that is between approximately 0.46 mil and 10.4 mil.

12 Claims, 2 Drawing Sheets

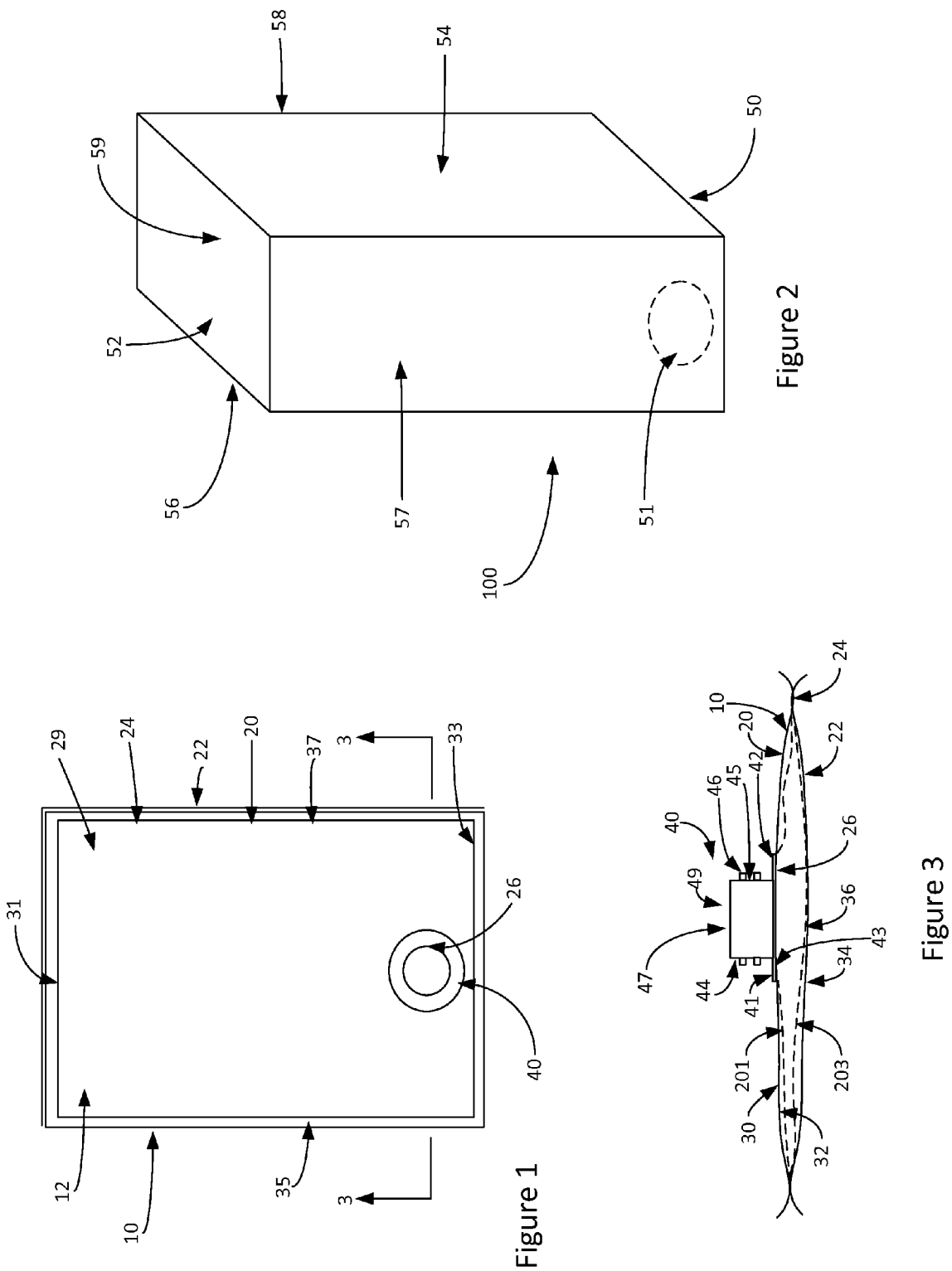

FILM FOR FLEXIBLE PACKAGING FOR USE IN BAG IN BOX PACKAGING AND BAGS MADE THEREFROM

CROSS-REFERENCE TO RELATED APPLICATION

N/A

BACKGROUND OF THE DISCLOSURE

1. Field of the Disclosure

The invention relates in general to polymer based films, and more particularly, to a film for flexible packaging. Among other uses, the film of the present disclosure is well suited for use in association with bag in box packaging.

2. Background Art

The use of bag in box packaging is ubiquitous. Generally such packaging comprises a flexible bag made from a plurality of panels of polymer film. The panels are coupled together through a plurality of seals to form a generally fluid tight cavity. A spout may be provided on one of the panels to provide ingress into the fluid tight cavity. The flexible bag is then placed within a rigid outer container.

Such bags are generally filled with a flowable material and are generally shipped and stored in the rigid outer container. Eventually, the flowable material is dispensed from the flexible bag. Through storage, transport and use, the bags are subjected to various loads, some of which are repetitive loads. Such loads and movement of the flowable material within the flexible bag will degrade the bag and impart forces onto the flexible bag.

Thus, it is known that the bag must meet certain criteria relative to strength and operational performance. Generally, such flexible bags are formed from a plurality of coextruded or laminated film structures. A number of different structures are known to have been utilized. There is an ever present need to improve the film structures relative to performance, and cost. That is, there is a need to provide improved performance through films that are more easily and cost effectively produced.

SUMMARY OF THE DISCLOSURE

The disclosure is directed to a film for a bag. The film comprises a plurality of extruded layers, with the layers comprising a first layer, a second layer, a third layer, a fourth layer, and a fifth layer. The first layer is a mixture of metallocene polyethylene and linear low density polyethylene. The second layer contacting the first layer and comprising a tie layer. The third layer contacts the second layer opposite the first layer. The third layer comprises ethylene vinyl alcohol having a mol % ethylene of at least approximately 24 mol % and a thickness of between approximately 0.01 mil and 0.40 mil. The fourth layer contacts the third layer opposite of the second layer. The fourth layer comprises a tie layer. The fifth layer contacts the fourth layer opposite the third layer. The fifth layer comprises a metallocene polyethylene and liner low density polyethylene. The film includes a thickness that is between approximately 0.46 mil and 10.4 mil.

In a preferred embodiment, in the first layer, the metallocene polyethylene and the linear low density polyethylene has a ratio of 50%-50% by weight.

In another preferred embodiment, the third layer comprises a plurality of layers of ethylene vinyl alcohol.

In another preferred embodiment, the third layer comprises an ethylene vinyl alcohol having a mol % ethylene of at least 32 mol %.

Preferably, the third layer comprises an ethylene vinyl alcohol having a mol % ethylene of at least 38 mol % and a thickness of approximately substantially 0.1 mil. Additionally, the thickness of the overall film comprises approximately substantially 3.4 mil.

In another preferred embodiment, the third layer is directly coupled to the second layer on one side and the fourth layer on the other side. The first layer is directly coupled to the second layer on a side opposite of the third layer. The fifth layer is directly coupled to the fourth layer on a side opposite of the third layer. The structure defines a total of five different layers directly coupled to each other.

In another preferred embodiment, in the fifth layer, the metallocene polyethylene and the linear low density polyethylene has a ratio of 80%-20% metallocene polyethylene by weight.

In another aspect of the disclosure, the disclosure comprises a film for a bag consisting essentially of a coextrusion of five layers. The five layers comprise a first layer comprising a mixture of metallocene polyethylene and linear low density polyethylene. A second layer contacts the first layer and comprises a tie layer. A third layer contacts the second layer opposite the first layer. The third layer comprises ethylene vinyl alcohol having a mol % ethylene of at least approximately 24 mol % and a thickness of between approximately 0.01 mil and 0.40 mil. The fourth layer contacts the third layer opposite of the second layer. The fourth layer comprises a tie layer. The fifth layer contacts the fourth layer opposite the third layer. The fifth layer comprises a metallocene polyethylene and liner low density polyethylene. The five layers include a thickness that is between approximately 0.46 mil and 10.4 mil.

In a preferred embodiment, in the first layer, the metallocene polyethylene and the linear low density polyethylene has a ratio of 50%-50% by weight.

In another preferred embodiment, the third layer comprises a plurality of layers of ethylene vinyl alcohol.

Preferably, the third layer comprises an ethylene vinyl alcohol having a mol % ethylene of at least 32 mol %.

In another preferred embodiment, the third layer comprises an ethylene vinyl alcohol having a mol % ethylene of at least 38 mol % and a thickness of approximately substantially 0.1 mil. The thickness of the overall bag being approximately substantially 3.4 mil.

In a preferred embodiment, the third layer is directly coupled to the second layer on one side and the fourth layer on the other side. The first layer is directly coupled to the second layer on a side opposite of the third layer. The fifth layer is directly coupled to the fourth layer on a side opposite of the third layer, so as to define a total of five different layers directly coupled to each other.

In a preferred embodiment, the metallocene polyethylene and the linear low density polyethylene in the fifth layer has a ratio of 80%-20% metallocene polyethylene by weight.

In yet another aspect of the disclosure, the disclosure is directed to a bag. The bag includes a front panel, a back panel and a plurality of seals. The front panel has an outer surface and an inner surface opposite the outer surface. The back panel has an outer surface and an inner surface opposite the outer surface. The plurality of seals join the front panel to the back panel with the inner surface of the front panel facing the inner surface of the back panel. Collectively, these define a fluid cavity. Each of the front panel and the back panel comprises a film. The film comprises a first layer which is a mixture of metallocene polyethylene and linear low density polyethylene. A second layer contacts the first layer and comprises a tie layer. The third layer contacts the second layer opposite the first layer. The third layer comprises ethylene vinyl alcohol having a mol % ethylene of at least approximately 24 mol % and a thickness of between approximately 0.01 mil and 0.40 mil. The fourth layer contacts the third layer opposite the second layer. The fourth layer comprises a tie layer. The fifth layer contacts the fourth layer opposite the third layer. The fifth layer comprises a metallocene polyethylene and liner low density polyethylene. The film includes a thickness that is between approximately 0.46 mil and 10.4 mil.

In a preferred embodiment, the plurality of seals directly join the inner surface of the front panel to the inner surface of the back panel, thereby defining a single ply.

In another preferred embodiment, a plurality of inner panels is positioned between the front panel and the back panel, with the plurality of seals joining each of the panels to each other, thereby defining a multiple plies.

In another preferred embodiment, the bag further includes an opening that extends through the front panel and at least one of the inner panels. A spout is disclosed with a base flange and an upstanding wall defining a passage. The base flange is coupled to the openings so as to provide fluid-tight communication between the passageway and the fluid cavity.

In another preferred embodiment, the third layer comprises an ethylene vinyl alcohol having a mol % ethylene of at least 38 mol % and a thickness of approximately substantially 0.1 mil, with the thickness of the film being approximately substantially 3.4 mil.

BRIEF DESCRIPTION OF THE DRAWINGS

The disclosure will now be described with reference to the drawings wherein:

FIG. 1 of the drawings is a perspective view of a flexible bag of the present disclosure;

FIG. 2 of the drawings is a perspective view of a rigid outer container into which the flexible bag of the present disclosure can be placed;

FIG. 3 of the drawings is a cross-sectional view of a flexible bag of the present disclosure, showing, in particular, the structure of the spout and the flexible bag, taken generally about lines 3-3 of FIG. 1.

DETAILED DESCRIPTION OF THE DISCLOSURE

Figure 4:
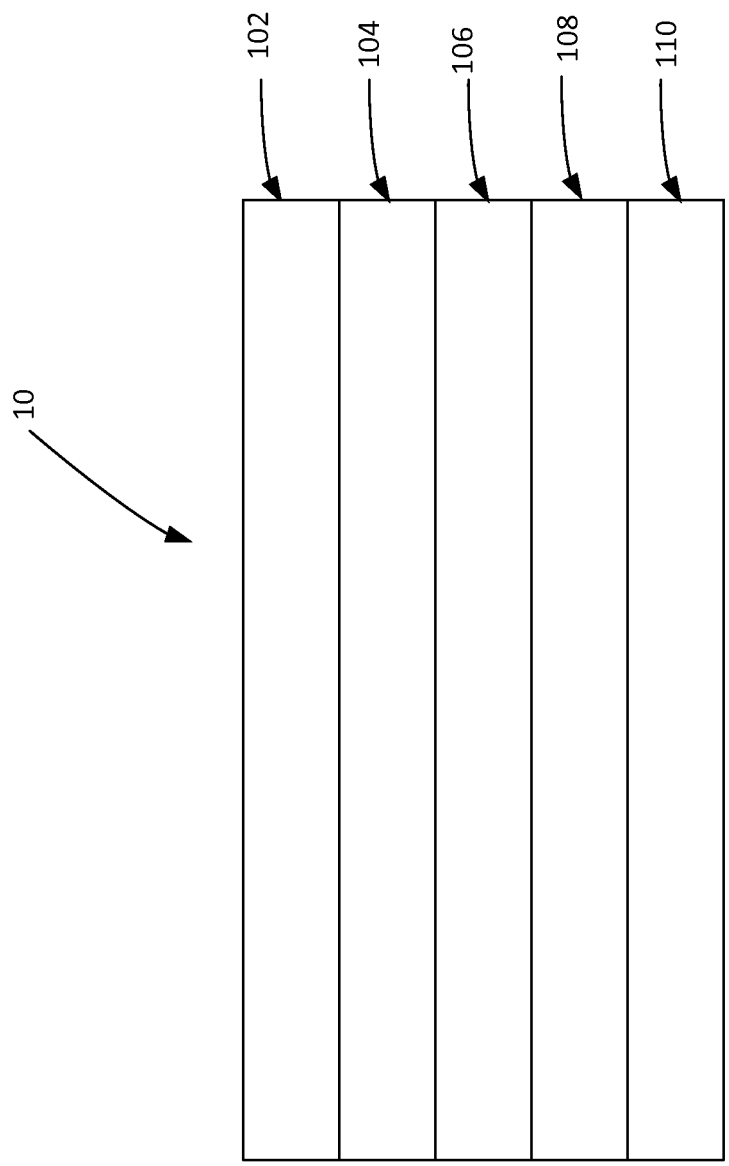
FIG. 4 of the drawings is a cross-sectional view of the layer structure of the film of the flexible bag.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1, 3 and 4, the film is shown generally at 10. The film comprises a multi-layer extrusion that can be formed into bags, such as bag 12. The bags can be used alone, or in combination with outer rigid containers, such as container 100. One such use is in association with bag-in-box packaging. In such applications, the bags may be used to store and dispense flowable material, including, but not limited to liquids, gels, syrups, such as soft drink syrup, beverages, such as wine, purees among other flowable material. It is contemplated that such a flowable material may comprise any number of different viscosities, and may include a solids content. The foregoing examples of flowable material are meant to be illustrative, and not deemed to be limiting.

One illustrative bag of the type contemplated for use that can be formed in part or in whole from the film of the present disclosure is shown in FIGS. 1 and 3 as comprising a commonly known pillow type bag. Such a bag includes front panel 20 and back panel 22. Front panel 20 includes outer surface 30 and inner surface 32. The back panel 22 includes outer surface 34 and inner surface 36. The front and back panel are positioned in an overlying orientation so that the inner surfaces face each other.

The panels are then coupled together by way of seals 24. In the case of a pillow type container, the seals 24 include a top seal 31, bottom seal 33, first side seal 35 and second side seal 37. The seals are generally perpendicular to adjacent seals and parallel to opposing seals to generally define a square or rectangular configuration, thereby defining a generally square or rectangular cavity 29. The seals may be formed through the application of heat, or through other procedures, including, but not limited to RF welding, ultrasonic welding, adhesive, among others. The disclosure is not limited to any particular manner of attachment of the panels.

For many pillow type containers, an opening 26 is provided through the front panel 20 proximate, but spaced apart from the bottom seal 33. A spout 40 can be coupled thereto in sealed engagement. In certain embodiments, multiple spouts may be provided, one, for example, for dispensing, and one for filling. In other embodiments, spouts may be positioned along the seals so as to extend between the panels. The film is configured for use in association with multiple configurations of spouts, as well as in embodiments that do not require spouts.

One type of spout is shown in FIG. 3 as comprising a base flange 42, and upstanding wall 44 extending from the base flange. The base flange includes top surface 41 and bottom surface 43 opposite top surface 41. Generally the base flange is substantially planar and generally perpendicular to the upstanding wall 44. Either one of the top and bottom surfaces may be sealed to the front panel about opening 26, through a heat seal. Of course, other sealing methods, such as those identified above may be utilized in place of heat sealing.

The upstanding wall includes an outer surface 45 which includes grasping flanges, such as grasping flange 46 extending about the outer surface. Generally, these grasping flanges are disposed in a spaced apart orientation along the outer surface, generally parallel to the base flange 42. Of course, other configurations are likewise contemplated. The upstanding wall defines a passageway, which is generally of a circular configuration, terminating at opening 49 spaced distally from the base flange 42. Of course, other cross-sectional configurations are contemplated, and the disclosure is not limited to any particular configuration of the spout.

It will be understood that such a bag may be positioned within an outer carton, such as an outer box 100 which is shown in FIG. 2. The outer box includes a bottom wall 50, top wall 52, first side wall 54, second side wall 56, front wall 57 and back wall 58. The outer box that is shown in the figures comprises a rectangular cubic configuration. Of course, such a configuration is merely exemplary, and not to be deemed limiting. It will be understood that other containers, such as those having fewer or greater number of sides (i.e., a hexagonal or octagonal box having a plurality of sides along with a bottom and top wall are contemplated as well). In some embodiments, one of the walls, and in the embodiment shown, the front wall 57, may include an opening 51 which provides access to the cavity 59, and the bag therein. In other embodiments, it may be necessary to remove one of the walls to gain access to cavity 59. It is contemplated that the outer carton comprises a paperboard material, such as a corrugated paperboard. Of course, other materials are likewise contemplated for use, including, but not limited to, other paperboard materials, polymer materials, including bio-polymers, and the like.

It will be understood that any number of different members may be coupled to the spout described above. For example, a cap or a dispensing fitment may be coupled to the above configuration. Such connectors may include those disclosed in U.S. Pat. No. 7,387,277 issued to Verespej et al, U.S. Pat. No. 7,469,522 issued to Verespej et al, U.S. Pat. No. 7,114,625 issued to Jones, et al, U.S. Pat. No. 8,448,799 issued to Thurman, as well as various Quick connect, disconnect fittings (QCD) that are utilized in association with soft drink syrups among other. It is also contemplated that dispensers such as those disclosed in U.S. Pat. Nos. 4,619,377 and 6,978,981 both of which are issued to Roos as well as U.S. Pat. Nos. 6,045,119; 6,296,157 and 6,360,925 issued to Erb, U.S. Pat. No. 8,336,743 issued to Bellmore, U.S. Pat. No. 7,240,811 issued to Roser. Additionally, it will be understood that the spout or the cavity may further include different structures to aid in the dispensing of flowable material. Among such structures, it is contemplated that the structures coupled to the spout, including but not limited to those shown in U.S. Pat. No. 5,749,493 issued to Boone et al; U.S. Pat. No. 5,941,421 issued to Overman et al and U.S. Pat. No. 6,102,252 issued to Overman et al and U.S. Pat. No. 4,138,036 issued to Bond are contemplated for use. Each of the foregoing references are incorporated by reference in their entirety.

It will be understood that while a pillow type bag is shown, the film is not limited to use therewith. For example, the bay may comprise a gusseted bag wherein four panels are coupled together to form a generally rectangular shaped bag. One such configuration is shown in U.S. Pat. No. 5,788,121 issued to Sasaki et al. Another such configuration is shown in U.S. Pat. No. 6,783,277 issued to Edwards. The foregoing patents are incorporated by reference in their entirety.

It will further be understood that a single ply pillow type bag is shown in FIG. 1 (with optional dashes shown in FIG. 3 for an additional inner ply 201, 203), while other configurations are contemplated. For example, a multi-ply bag, pillow, or otherwise, is likewise contemplated for use. For example, such a container may include multiple plies, sharing common seals, or having separate individual seals. It will be understood that each ply may comprise a different wall construction, and it is contemplated that the multiple plies may comprise co-extrusions, laminates or a combination of the structures. For example, as set forth below, a two ply configuration was utilized for testing purposes, with the outer ply comprising the film of the present disclosure.

The film 10 is shown in FIG. 4 as including a plurality of layers, namely, five separate layers including first layer 102, second layer 104, third layer 106, fourth layer 108 and fifth layer 110. It is contemplated that the layers are co-extruded together to form a film of substantially uniform cross-sectional configuration, with the layers being adjacent to each other in successive order. It is contemplated that the overall thickness of the film is between substantially approximately 0.46 mil and substantially approximately 10.4 mil. When formed into a bag, it is contemplated that the first layer comprises the outer layer with the inner layer formed by the fifth layer.

The first layer 102 comprises a mixture of a metallocene polyethylene (mPE) resin and a linear low density polyethylene resin (LLDPE). In an embodiment, the first layer comprises a 50% mixture of each, by weight, at a layer thickness of substantially approximately 1.0 mil. It is preferred that the blend have a density of less than substantially approximately 0.92 g/cc. It is preferred that the mPE have a density of substantially approximately 0.906 g/cc and more preferably between 0.892 g/cc and 0.920 g/cc. It is preferred that the LLDPE have a density of substantially approximately 0.920 g/cc and more preferably between 0.900 g/cc and 0.940 g/cc. It is also contemplated that the ratio of mPE to LLDPE can be generally anywhere between 0% and 100%, as long as the density is with the above specified range. It is contemplated that the thickness of the first layer 102 may be between substantially approximately 0.1 mil and substantially approximately 3 mil, and most preferably substantially approximately 1 mil.

A number of additives may be incorporated into the first layer, including, but not limited to an anti-block, slip, polymer processing aid and anti-oxidant additives. Other additives are also contemplated by the present disclosure to be incorporated into the first layer. The additives may be incorporated for particular applications, or for particular resin combinations to provide improved characteristics as desired.

The second layer 104 comprise a tie layer, configured to provide a means by which to join the first layer 102 to the third layer 106. One such tie layer may comprise an anhydride-modified polyethylene resin. It is contemplated that the tie layer is substantially approximately 0.3 mil in thickness. Preferably, the tie layer is between 0.1 mil and 1.0 mil in thickness, and most preferably substantially approximately 0.3 mil. Among other materials resin from DuPont under the trade name Bynel, as well as from LyondellBassel under the trade name Plexar, as well as Mitsu under the trade name Admer. Other tie layer materials may comprise polypropylene and other non-polyolefins that can be anhydride-modified. Such materials may comprise the entirety of the composition of the layer, or they may be blended with other non-anhydride-modified materials. For example, to reduce cost, additional materials may be blended. It is also contemplated that acid copolymers, sodium ionomers, zinc ionomers, ethylene vinyl acetate or ethylene methyl acrylate can be utilized as well.

The third layer 106 comprises an ethylene vinyl alcohol (EVOH) material, preferably, including close to 100% EVOH, which can be formed as a single layer, or through multiple layers. The multiple layers can be in direct contact with each other, or separated by other tie layers. The third layer 106 is substantially approximately 0.1 mil in thickness. In the embodiment contemplated a relatively high mol % ethylene EVOH is contemplated for use, such as a 38 mol % ethylene EVOH. A suitable range of mol % ethylene is substantially approximately greater or equal to 24 mol %. Such a suitable range provides the necessary flexibility for the EVOH layer of the present film. It is also contemplated that a base EVOH material may be modified by to increase ductility (especially if the mol % ethylene of EVOH is below, for example 32 mol %). It is further contemplated that the thickness of the EVOH layer be less than substantially approximately 0.3 mil, and most preferably between substantially approximately 0.01 mil and 0.40 mil. It will be understood that below 0.01, it has been found that the resin generally does not sufficiently provide barrier to chemicals, flavors and oxygen. At a thickness of greater than the upper range, it has been found that the layer exhibits generally poor resistance to flex-cracking.

The fourth layer 108 is shown in FIG. 4 as comprising the same material from which the second layer is formed. The fourth layer 108 is configured to facilitate the mating and adhesion of the third layer 106 and the fifth layer 110 together. Preferably, the fourth layer 108 comprises a layer having a thickness of substantially approximately 0.3 mil, with a range of approximately substantially 0.1 mil and 1.0 mil.

The fifth layer 110 (also referred to herein as the product contact layer) is shown in FIG. 4 as comprising a mixture of a mPE resin and LLDPE resin. In an embodiment, the fifth layer comprises a 80%/20% mixture of mPE to LLDPE, by weight, at a layer thickness of substantially approximately 1.7 mil. The material contemplated has similar ranges to that of the first layer 102. It is contemplated that the thickness of the fifth layer 110 may be between substantially approximately 0.1 mil to 5.0 mil. As with the first layer, the mixture of mPE and LLDPE can be varied between 0% and 100%, depending on the application, and similar construction variations are contemplated. In the embodiment shown, the first layer and the fifth layer are of a different thickness. It will be understood, however, that a symmetrical configuration is also contemplated.

It is contemplated that in the configuration of a bag, such as bag 12, each of the front panel 20 and the back panel 22 each comprise a film such as film 10 oriented in a such a manner as to have the inner surface 32 and 36 comprise the fifth layer of material, with the outer surface 30 and 34 comprise the first layer of material. The abutting fifth layers are suitable for the formation of seals in the manner disclosed above.

A number of sample bags have been prepared to test the performance of the bags. In one contemplated embodiment, a two ply bag was formed. The inner ply comprised a 1.9 mil mPE/LLDPE based film sold by Scholle Corporation under the trade name FlexiForce 20. The outer ply comprised a film made in accordance with the present disclosure. Specifically, such a film included a first layer having the following structure:

Layer 1: 1.0-mil 50% mPE/50% LLDPE with additives
Layer 2: 0.3-mil 100% tie layer
Layer 3: 0.1-mil 100% EVOH (38 mol % ethylene)
Layer 4: 0.3-mil 100% tie layer
Layer 5: 1.7-mil 80% mPE/20% LLDPE with additives The performance of the film was then tested under a number of different parameters. The testing was also compared with three different competitive samples. These tests included physical properties testing, bag transport simulation testing and bag drop testing. The first and second competitive structures were thinner (3.4 mils for the film created in accordance with the present disclosure versus 2.2 mils for the competitive #1 sample, and 2.8 mils for the competitive #2 sample), whereas the third competitive structure was thicker (3.4 mils v 4.4 mils for the competitive #3 sample).

The physical properties testing tested puncture strength (grams), Gelbo flex testing in a cross direction (number of holes per 2,000 cycles), Gelbo flex testing in the machine direction (number of holes per 2,000 cycles). The bag produced with the film in accordance with the present disclosure exhibited a puncture strength which was greater than the competitive films, and a fewest number of holes in the Gelbo Flex testing. The chart below details the results of the physical testing.

|  | Disclosure | Competitive #1 | Competitive #2 | Competitive #3 |
| --- | --- | --- | --- | --- |
| Puncture Strength (grams) | 800 | 360 | 460 | 700 |
| Gelbo Flex Test - Cross Direction (# holes per 2,000 cycles) | 6 | 47 | 54 | 35 |
| Gelbo Flex Test - Machine Direction (# holes per 2,000 cycles) | 7 | 53 | 55 | 35 |

With respect to the bag transport simulations, testing was undertaken relative to bags formed from the film of competitive #2 and competitive #3. The test was conducted with filled 20 liter bags according to ASTA 1A 2001, at 14,200 vibratory impacts (at 2 Hz for 118 minutes). The bag formed from film of the present disclosure outperformed both competitive films having no leaks after the full 118 minutes. Details are below.

|  | Disclosure | Competitive #2 | Competitive #3 |
| --- | --- | --- | --- |
| Number of Leaks after 60 minutes | 0 | 1 | 0 |
| Number of Leaks after 90 minutes | 0 | 8 | 7 |
| Number of Leaks after 118 minutes | 0 | 28 | 23 |

With respect to the bag drop performance, a bag of the present disclosure was compared to the bag formed from the film of competitive #3. In particular, 20 liter bags were filled with a flowable material and dropped flat from a 30 inch height. Each bag was dropped multiple times until the bag broke and leaked. Generally, it is desirable to be able to withstand leaking for three or more drops. The bag from competitive #3 leaked on the first or second drop 60% of the time. On the contrary, the average number of drops until leaking with the bag formed from the film of the present disclosure was 39, with the lowest number of drops until leak was 23.

Thus in all three of the tests, the bag made in accordance with the present disclosure exhibited significantly improved performance over three different prior art competitive films.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A film for a bag comprising a plurality of extruded layers, the layers comprising:
   a first layer comprising a mixture of metallocene polyethylene and linear low density polyethylene, wherein the first layer has a density of between 0.892 g/cc and 0.920 g/cc;
   a second layer contacting the first layer and comprising a tie layer;
   a third layer contacting the second layer opposite the first layer, the third layer comprising ethylene vinyl alcohol having a mol % ethylene of at least approximately 24 mol % and a thickness of between approximately 0.01 mil and 0.30 mil and comprising a plurality of layers of ethylene vinyl alcohol;
   a fourth layer contacting the third layer opposite of the second layer, the fourth layer comprising a tie layer; and
   a fifth layer contacting the fourth layer opposite the third layer, the fifth layer comprising a metallocene polyethylene and linear low density polyethylene, wherein the film includes a thickness that is between approximately 0.46 mil and 3.8 mil.

2. The film for a bag of claim 1 wherein the metallocene polyethylene and the linear low density polyethylene has a ratio of 50%-50% by weight.

3. The film for a bag of claim 1 wherein the third layer is directly coupled to the second layer on one side and the fourth layer on the other side, with the first layer being directly coupled to the second layer on a side opposite of the third layer, and the fifth layer is directly coupled to the fourth layer on a side opposite of the third layer, so as to define a total of five different layers directly coupled to each other.

4. The film for a bag of claim 1 wherein the metallocene polyethylene and the linear low density polyethylene has a ratio of 80%-20% metallocene polyethylene by weight.

5. A film for a bag consisting essentially of:
   a coextrusion of five layers, the five layers comprising:
      a first layer comprising a mixture of metallocene polyethylene and linear low density polyethylene, wherein the first layer has a density of between 0.892 g/cc and 0.920 g/cc;
      a second layer contacting the first layer and comprising a tie layer;
      a third layer contacting the second layer opposite the first layer, the third layer comprising ethylene vinyl alcohol having a mol % ethylene of at least approximately 24 mol % and a thickness of between approximately 0.01 mil and 0.30 mil, wherein the third layer comprises a plurality of layers of ethylene vinyl alcohol;
      a fourth layer contacting the third layer opposite of the second layer, the fourth layer comprising a tie layer; and
      a fifth layer contacting the fourth layer opposite the third layer, the fifth layer comprising a metallocene polyethylene and linear low density polyethylene,
      wherein the five layers include a thickness that is between approximately 0.46 mil and 3.8 mil.

6. The film for a bag of claim 5 wherein the metallocene polyethylene and the linear low density polyethylene has a ratio of 50%-50% by weight.

7. The film for a bag of claim 5 wherein the third layer is directly coupled to the second layer on one side and the fourth layer on the other side, with the first layer being directly coupled to the second layer on a side opposite of the third layer, and the fifth layer is directly coupled to the fourth layer on a side opposite of the third layer, so as to define a total of five different layers directly coupled to each other.

8. The film for a bag of claim 5 wherein the metallocene polyethylene and the linear low density polyethylene has a ratio of 80%-20% metallocene polyethylene by weight.

9. A bag comprising:
   a front panel having an outer surface and an inner surface opposite the outer surface;
   a back panel having an outer surface and an inner surface opposite the outer surface; and
   a plurality of seals joining the front panel to the back panel with the inner surface of the front panel facing the inner surface of the back panel, to define a fluid cavity,
   each of the front panel and the back panel comprising a film that is coextruded and includes a plurality of layers, the plurality of layers comprising:
      a first layer comprising a mixture of metallocene polyethylene and linear low density polyethylene, wherein the first layer has a density of between 0.892 g/cc and 0.920 g/cc;
      a second layer contacting the first layer and comprising a tie layer;
      a third layer contacting the second layer opposite the first layer, the third layer comprising ethylene vinyl alcohol having a mol % ethylene of at least approximately 24 mol % and a thickness of between approximately 0.01 mil and 0.30 mil and comprising a plurality of layers of ethylene vinyl alcohol;
      a fourth layer contacting the third layer opposite of the second layer, the fourth layer comprising a tie layer; and
      a fifth layer contacting the fourth layer opposite the third layer, the fifth layer comprising a metallocene polyethylene and linear low density polyethylene,
      wherein the film includes a thickness that is between approximately 0.46 mil and 3.8 mil.

10. The bag of claim 9 wherein the plurality of seals directly join the inner surface of the front panel to the inner surface of the back panel, thereby defining a single ply bag.

11. The bag of claim 9 further comprising a plurality of inner panels positioned between the front panel and the back panel, with the plurality of seals joining each of the panels to each other, thereby defining a multiple ply bag.

12. The bag of claim 11 further comprising an opening that extends through the front panel and at least one of the inner panels, the bag further comprising a spout having a base flange and an upstanding wall which defines a passageway, wherein the base flange is coupled to the opening in each of the front panel and at least one of the inner panels so as to provide fluid-tight communication between the passageway defined by the upstanding wall and the fluid cavity.

* * * * *